United States Patent
Soryal et al.

(10) Patent No.: US 12,267,752 B2
(45) Date of Patent: Apr. 1, 2025

(54) SENTIMENT CAPTURE BY WIRELESS NETWORK ELEMENTS

(71) Applicant: AT&T Intellectual Property I, L.P., Atlanta, GA (US)

(72) Inventors: Joseph Soryal, Glendale, NY (US); Shawn Rajguru, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 351 days.

(21) Appl. No.: 17/656,803

(22) Filed: Mar. 28, 2022

(65) Prior Publication Data
US 2023/0308843 A1 Sep. 28, 2023

(51) Int. Cl.
*H04W 4/30* (2018.01)
*G06V 10/771* (2022.01)
*G06V 40/16* (2022.01)

(52) U.S. Cl.
CPC ............ *H04W 4/30* (2018.02); *G06V 10/771* (2022.01); *G06V 40/168* (2022.01)

(58) Field of Classification Search
None
See application file for complete search history.

(56) References Cited

U.S. PATENT DOCUMENTS

| | | | | |
|---|---|---|---|---|
| 2013/0325437 A1* | 12/2013 | Lehman | ................ | G06F 40/253 704/9 |
| 2014/0266782 A1* | 9/2014 | You | ........................ | G08C 19/16 340/870.03 |
| 2014/0280529 A1* | 9/2014 | Davis | .................... | H04L 67/535 709/204 |
| 2022/0292154 A1* | 9/2022 | Ivry | ..................... | G06F 16/9536 |
| 2023/0039235 A1* | 2/2023 | Biswas | ................... | G10L 15/22 |

* cited by examiner

Primary Examiner — Neil R McLean
(74) Attorney, Agent, or Firm — Guntin & Gust, PLC; Mark Wilinski

(57) ABSTRACT

Sentiment capture by wireless network elements is provided herein. A method can include extracting, by a system comprising a processor, features of sensor data captured by a sensor, communicatively coupled to the system via a wireless communication network and located in an area, wherein the sensor data is representative of respective persons present in the area, resulting in extracted features; determining, by the system, sentiment data, representative of an emotional condition of the respective persons present in the area, by correlating the extracted features to circumstantial properties associated with the area; and generating, by the system based on the sentiment data, a response to a query for information associated with the area.

20 Claims, 11 Drawing Sheets

SENTIMENT CAPTURE BY WIRELESS NETWORK ELEMENTS

TECHNICAL FIELD

The present disclosure relates to data management and processing, and, in particular, to techniques for capturing and processing data relating to sentiment.

BACKGROUND

Advances in data storage and processing have greatly increased the size and scope of data that can be analyzed by computing systems. By way of example, social media platforms can capture a person's sentiment, e.g., mental or emotional condition, based on content posted to the platforms by their users. Similarly, some audio devices, such as recording devices at call centers or the like, can capture customer sentiment from audio analysis. Given the dynamic nature of the data processing field, further techniques to capture public sentiment are also desirable.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a method as described herein can include extracting, by a system including a processor, features of sensor data captured by a sensor that is communicatively coupled to the system via a wireless communication network and located in an area, resulting in extracted features. The sensor data can be representative of respective persons present in the area. The method can further include determining, by the system, sentiment data, representative of an emotional condition of the respective persons present in the area, by correlating the extracted features to circumstantial properties associated with the area. The method can also include generating, by the system based on the sentiment data, a response to a query for information associated with the area.

In another aspect, a system as described herein can include a processor and a memory that stores executable instructions that, when executed by the processor, facilitate performance of operations. The operations can include extracting data features captured by a sensor, communicatively coupled to the system via a wireless communication network and located in an area, resulting in extracted data features, where the data features are representative of respective persons in the area; generating condition data, representative of an emotional condition of the respective persons in the area, by correlating the extracted data features to circumstantial properties of the area; and generating, based on the condition data, a response to a query relating to the area.

Figure 1:
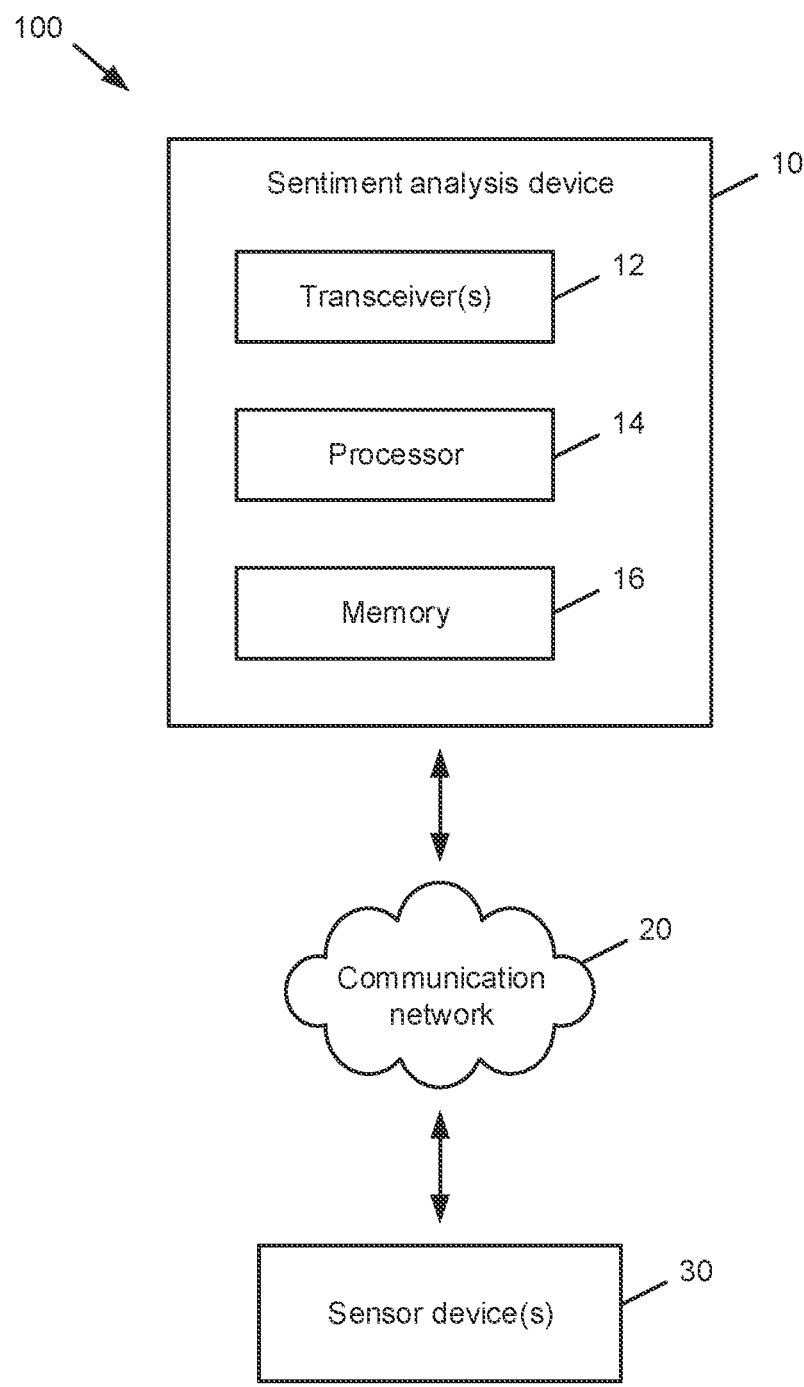
FIG. 1 is a block diagram of a system that facilitates sentiment capture by wireless network elements in accordance with various aspects described herein.

In a further aspect, a non-transitory machine-readable medium as described herein can include executable instructions that, when executed by a processor, facilitate performance of operations. The operations can include determining data features that are representative of sensor data, captured by a sensor located in an area and provided by the sensor via a wireless communication network, where the sensor data is representative of persons present in the area; generating sentiment data, representative of an emotional condition of the persons present in the area, by correlating the data features with transient properties associated with the area; and preparing, based on the sentiment data, response data representative of a response to a query for information relating to the area Referring first to FIG. 1, a system 100 that facilitates sentiment capture by wireless network elements is illustrated. System 100 as shown by FIG. 1 includes a sentiment analysis device 10 that can communicate with respective devices via a communication network 20. In an implementation, the communication network 20 can be a cellular communication network, e.g., a Fifth Generation (5G) and/or Sixth Generation (6G) cellular network. Also or alternatively, the communication network 20 could operate according to other suitable network technologies, such as Wi-Fi, BLUETOOTH®, or the like.

As further shown in FIG. 1, the sentiment analysis device 10 can communicate with one or more sensor devices 30 via the communication network 20. While only one sensor device 30 is illustrated in FIG. 1 for simplicity of illustration, it is noted that the sentiment analysis device 10 can communicate with any suitable number of sensor devices 30, and/or other devices, via the communication network 20. Additionally, while not shown in FIG. 1, the sentiment analysis device 10 could communicate with respective sensor devices 30 and/or other devices via multiple communication networks in addition to, or in place of, the communication network 20.

The sensor device(s) 30 shown in FIG. 1 can include various devices that provide input data to the sentiment analysis device 10 according to various aspects as described below. For instance, sensor devices 30 can include any suitable device having one or more sensors (e.g., microphones or other audio sensors, cameras or other image/video sensors, motion sensors, temperature or pressure sensors, etc.) that provide sensor data input to the sentiment analysis device 10. Examples of sensor devices 30 can include, but are not limited to, wall and/or ceiling mounted cameras, autonomous and/or manually operated vehicles, mobile phones, smart watches and/or other wearable devices, and/or other suitable devices that can provide relevant information to the sentiment analysis device 10. Examples of sensor devices 30 that can be utilized by the sentiment analysis device 10 are described in further detail below with respect to FIG. 3.

The sentiment analysis device 10 shown in FIG. 1 includes one or more transceivers 12 that can communicate with (e.g., transmit messages to and/or receive messages from) the sensor devices 30 and/or other devices in system 100, e.g., via the communication network 20. The transceiver 12 can include respective antennas and/or any other hardware or software components (e.g., an encoder/decoder, modulator/demodulator, etc.) that can be utilized to process signals for transmission and/or reception by the sentiment analysis device 10 and/or associated devices.

The sentiment analysis device 10 shown in FIG. 1 further includes a processor 14 and a memory 16, which can be utilized to facilitate various functions of the sentiment analysis device 10. For instance, the memory 16 can include a non-transitory computer readable medium that contains computer executable instructions, and the processor 14 can execute instructions stored by the memory 16. For simplicity of explanation, various actions that can be performed via the processor 14 and the memory 16 of the sentiment analysis device 10 are shown and described below with respect to various logical components. In an aspect, the components described herein can be implemented in hardware, software, and/or a combination of hardware and software. For instance, a logical component as described herein can be implemented via instructions stored on the memory 16 and executed by the processor 14. Other implementations of various logical components could also be used, as will be described in further detail where applicable. In addition, an example computer architecture that can be utilized wholly or in part to implement various logical components described herein is described in further detail with respect to FIG. 11.

The processor 14 and the memory 16 of the sentiment analysis device 10 can process information relating to the emotional condition, medical status, mood, behavior patterns, and/or other aspects of the sentiment of persons present in a given area (e.g., a building, a city block, a park, etc.). Based on this sentiment information, the sentiment analysis device 10 can facilitate actionable items and insights relating to advertising, market direction, shopping trends, population behavior shifts, and/or other areas. Additionally, the sentiment analysis device 10 can capture public sentiment via devices that are already in use, such as cameras in smart cities and autonomous vehicles, cameras associated with user-operated mobile phones or other devices, or the like.

In an aspect, the functionality of the sentiment analysis device 10 as described herein can be implemented via a single physical device or multiple physical devices, e.g., devices of a distributed computing system, devices associated with a cloud computing service, etc. Accordingly, the term "sentiment analysis device" as used herein refers to any device and/or combination of devices that can capture and/or utilize data relating to sentiment.

By implementing various embodiments as described herein, various advantages can be realized that can improve the performance of a computing system. These advantages can include, but are not limited to, the following. User satisfaction with respect to a chatbot or other automated natural language processing system can be improved by increasing the relevancy and/or accuracy of information provided by the system. Computing resources (e.g., network bandwidth, processor cycles, power consumption, etc.) associated with a query processing system can be improved by reducing the average number of queries associated with obtaining desired information. Services provided to users in a given geographical area can be better tailored to the particular needs of those users. Other advantages are also possible.

Figure 2:
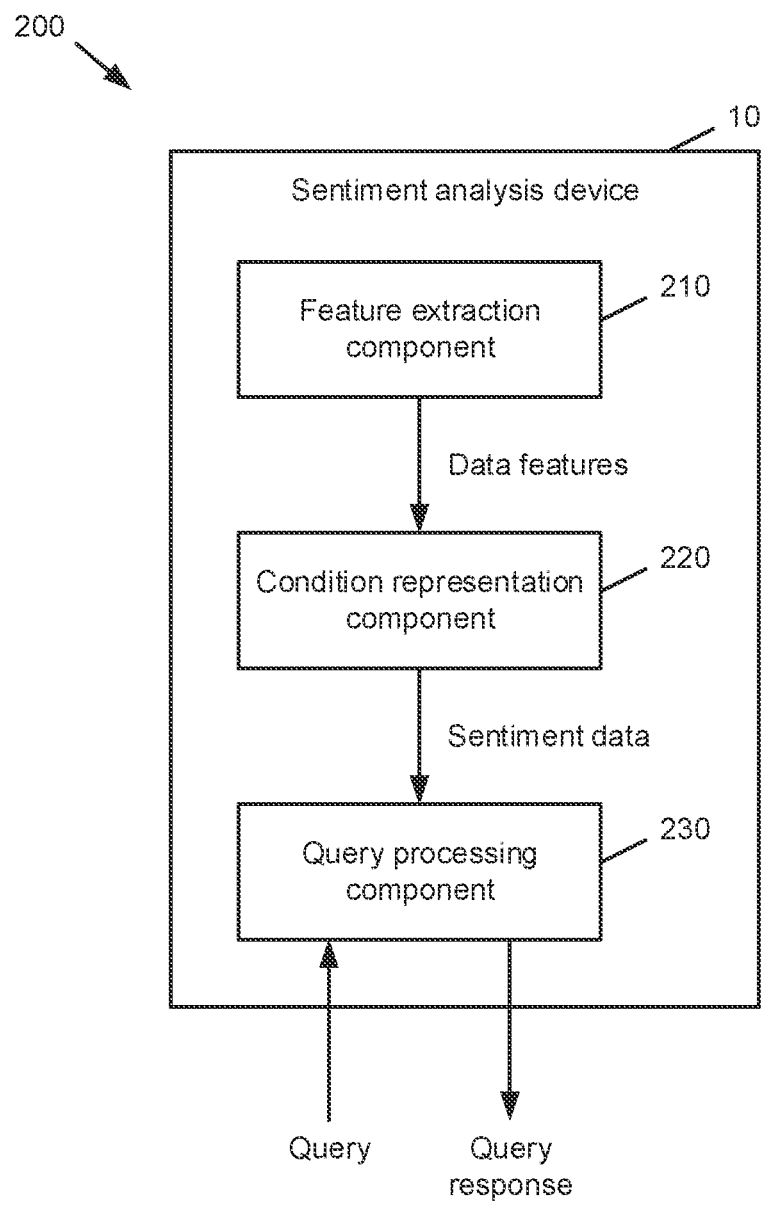
FIG. 2 is a block diagram that depicts the functionality of the sentiment analysis device of FIG. 1 in further detail in accordance with various aspects described herein.

With reference now to FIG. 2, a block diagram of a system 200 that facilitates sentiment capture by wireless network elements is illustrated. Repetitive description of like elements employed in other embodiments described herein is omitted for brevity. System 200 as shown in FIG. 2 includes a sentiment analysis device 10 that can operate in a similar manner to that described above with respect to FIG. 1. As shown in FIG. 2, the sentiment analysis device 10 of system 200 can include a feature extraction component 210 that can extract features of sensor data captured by a sensor that is communicatively coupled to the sentiment analysis device 10 via a communication network. For instance, referring again to FIG. 1, the sensor data utilized by the feature extraction component 210 can be captured by a sensor associated with a sensor device 30 that is communicatively coupled to the sentiment analysis device 10 via the communication network 20. Other implementations are also possible. Example sensors that can provide data to be processed by the feature extraction component 210 are described in further detail below with respect to FIG. 3.

In an aspect, the sensor data, and/or the features of the sensor data extracted by the feature extraction component 210, can be representative of people and/or other subjects that are present in an area in which the corresponding sensor(s) operate. By way of example, features that can be extracted by the feature extraction component 210 from sensor data can include audio features, image or video features, movement features, or the like. Respective non-limiting examples of data features that can be extracted by the feature extraction component 210 are provided below. It is noted, however, that other features are also possible.

In an aspect, data received by the feature extraction component 210, e.g., from one or more sensors, can include data that is representative of speech uttered by (originating from) a person present in a given area. Based on this input, the feature extraction component 210 can extract properties of the speech that can include voice tones present in the speech, content of the speech, or the like. By way of example, the feature extraction component 210 can extract the tone of a given person's speech to detect stress, aggression, frustration, boredom, etc. As another example, the feature extraction component 210 can perform speech to text processing in order to detect respective keywords that could give cues as to a person's sentiment. As a further example, the feature extraction component 210 can extract features relating to the presence or absence of speech in a given area and/or the volume of speech in the area e.g., to determine the extent of activity occurring in the area.

In another aspect, the feature extraction component 210 can detect audio events in a given area (e.g., a horn honking, a siren, a telephone ringing, etc.). In response, the feature extraction component 210 can classify the audio event and provide this classification to the condition representation component 220 to aid in determining corresponding sentiment data. By way of example, the feature extraction component 210 can compare an amount of audio activity present in audio data captured by one or more sensors in an area to a defined baseline amount of audio activity for that area, which can be a global baseline or a baseline associated with a given set of circumstances, e.g., as will be described below. If the amount of audio activity is greater than the baseline, the feature extraction component 210 can identify the increased activity as an audio event to be processed as described above.

In a further aspect, image and/or video data received by the feature extraction component 210 from one or more sensors can include a depiction of one or more persons present in an area associated with the sensor(s). From this data, the feature extraction component 210 can extract or otherwise identify properties present in the video data, such as facial expressions of a depicted person and/or changes thereto, movement and/or posture of a depicted person (e.g., whether a given person is walking or running, characteristics of a given person's body language, etc.), and so on. These extracted properties can then be provided to the condition representation component 220 for determination of appropriate sentiment data.

The sentiment analysis device 10 shown in FIG. 2 can further include a condition representation component 220 that can generate and/or otherwise determine sentiment data (also referred to herein as condition data) representative of an emotional condition of one or more persons present in an area associated with the sensors for which sensor data is provided to the feature extraction component 210. In an aspect, the condition representation component 220 can generate sentiment data by correlating the data features extracted by the feature extraction component 210 to circumstantial properties associated with the area. In an aspect, the condition representation component can facilitate generation and maintenance of a multi-layer map of a given area based on the sentiment data and corresponding circumstantial properties, e.g., as will be discussed in further detail with respect to FIGS. 4-6.

As used herein, the term "circumstantial properties" refers to any transient and/or other properties of a given area that can be utilized to provide context for data features generated by the feature extraction component 210. Examples of circumstantial properties that can be utilized can include, but are not limited to, the time of day, the present date and/or season, local weather conditions, planned events (e.g., concerts, sports games, etc.) and/or unplanned events (e.g., natural disasters, police activity, etc.) occurring in the area, or the like. Further examples of circumstantial properties that can be used can include information pertaining to classifications of a given area according to one or more criteria. By way of specific, non-limiting example, such properties can indicate the primary use(s) of an area (e.g., shopping, industrial, offices, etc.), the geographical features of the area (e.g., whether the area is located on or near mountains, beaches, etc.), demographics associated with the area, typical or average tourist volume for the area for a given season, cultural factors (e.g., a proportion of residents of a given area that regularly attend a church or other house of worship, baseline levels of pedestrians walking through an area at a given time of day or day of the week, etc.), or the like. Other circumstantial properties could also be used.

The sentiment analysis device 10 shown in FIG. 2 additionally includes a query processing component 230, which can generate a response to a query, e.g., a query for information associated with an area for which the condition representation component 220 has generated sentiment data, based on the sentiment data and/or other suitable information. By way of example, the query processing component 230 can be implemented via a chatbot operating in a chat interface, as will be described in further detail below with respect to FIG. 8. Also or alternatively, the query processing component 230 can receive and/or respond to queries through other means, such as a voice interface associated with a virtual assistant device, a holographic communication system, and/or other interfaces by which queries can be submitted and/or processed.

Figure 3:
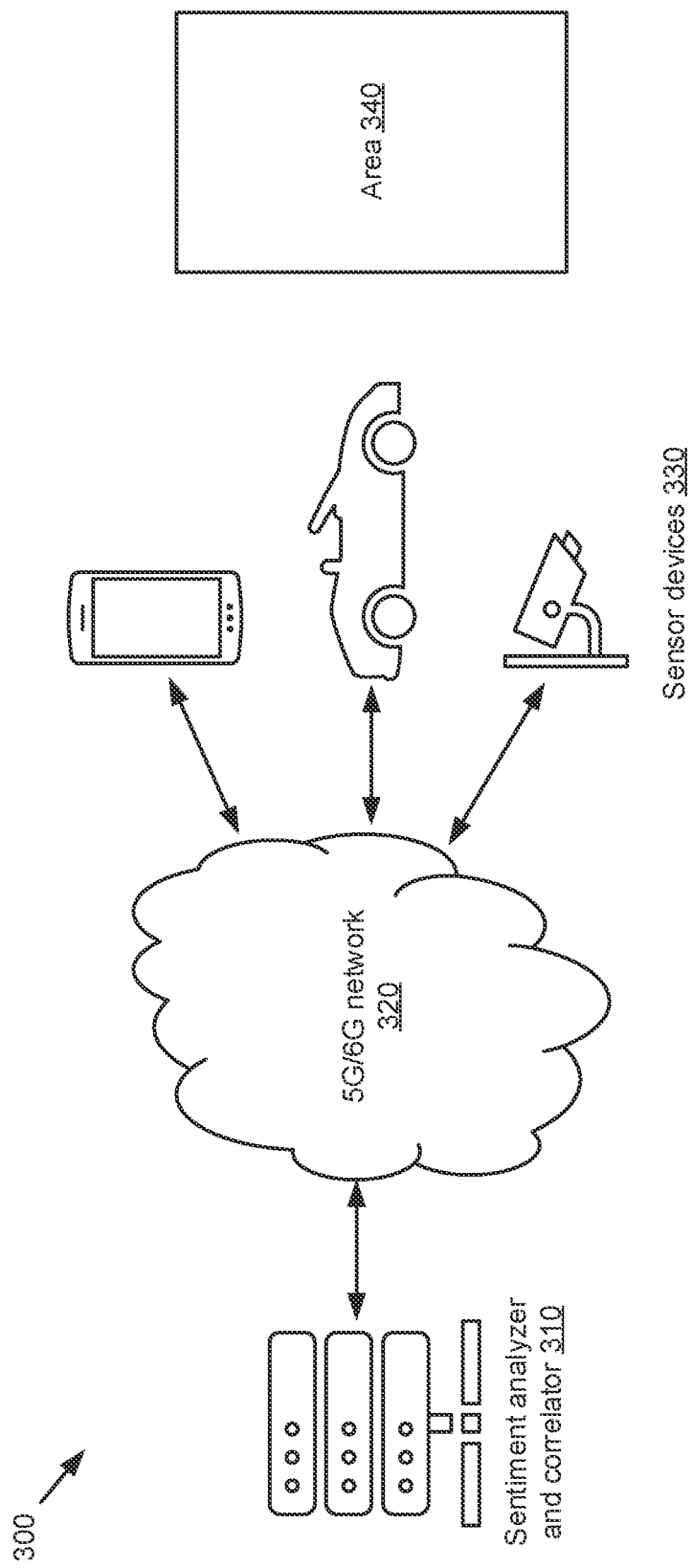
FIG. 3 is a diagram that depicts an example network environment in which various aspects described herein can function.

Referring now to FIG. 3, a diagram 300 that depicts an example network environment in which various aspects described herein can function is provided. Repetitive description of like elements employed in other embodiments described herein is omitted for brevity. It is noted that diagram 300 represents merely an example of a network environment that can be utilized to implement various aspects as described herein, and that other network environments could also be used. The network environment shown in diagram 300 includes a sentiment analyzer and correlator (SAC) 310, which can perform one or more functions of the sentiment analysis device 10 as described herein. For instance, the SAC 310 can collect data from respective sensors located in an area and perform correlation, e.g., in accordance with various aspects described herein, to determine sentiment data. In an implementation, the SAC 310 can operate as a cloud service, e.g., via one or more computing devices associated with a public or private cloud computing system. Alternatively, the SAC 310 can be implemented via one or more backend servers or other suitable computing devices.

As further shown in diagram 300, the SAC 310 can connect via a wireless network, here a 5G/6G network 320, to respective sensor devices 330 associated with a given (geographic) area 340. It is noted that other network technologies could also be used in addition to, or in place of, 5G and/or 6G technologies as shown in diagram 300.

In an aspect, the SAC 310 can leverage existing devices within a given area 340 to serve as sensor devices 330 and provide sensor data to the SAC 310 for further processing. For instance, as shown in diagram 300, the sensor devices 330 can include cars or other vehicles operating in the area 340, which can capture sensor data via cameras and/or other sensors installed on the vehicle. Data captured by respective sensors of a vehicle can subsequently be transferred to the SAC 310 over the network 320, e.g., via a vehicle-to-everything (V2X) communication system and/or another suitable vehicle communication system utilized by the vehicle. In some implementations, vehicles operating as sensor devices 330 can be substantially limited to various types of vehicles, such as autonomous vehicles; buses, trains, or other public transportation vehicles; or the like. Also or alternatively, vehicles can operate as sensor devices 330 pursuant to an opt-in system or other similar arrangements.

As an additional example, the sensor devices 330 can include respective components of a holographic communication system, such as cameras, microphones, projectors, or the like. These and/or other components of a holographic communication system can be mounted on or affixed to poles, walls, or other permanent or semi-permanent structures, e.g., as part of a smart city infrastructure. Alternatively, some or all components of a holographic communication system can be implemented via wearable devices and/or other personal devices. In an implementation, an owner or operator of a holographic communication system can agree to share videos and/or other media captured by the system with the SAC 310 via the network 320. Media shared in this way can be altered before transfer to the SAC 310, e.g., by anonymizing individual persons present in and/or otherwise associated with the media.

As a further example, the sensor devices 330 can include Internet of Things (IoT) devices, e.g., IoT devices deployed in a smart city, that include sensors for capturing audio, video, and/or other information. For example, the sensor devices 330 can include an IoT-connected motion sensor that can capture, e.g., pedestrian volume in a given area, traffic volume on a given road and/or information relating to the speed of respective vehicles traveling on the road, and/or other suitable information.

As still another example, the sensor devices 330 can include cameras, mobile phones, and/or other devices operated by users within the area 340. For example, individual users of a mobile phone or other mobile device can agree to share pictures, videos, or other media with the SAC according to a sharing agreement, e.g., as will be described in further detail below with respect to FIG. 9. Other types of sensor devices 330 are also possible.

In an aspect, the SAC 310 can obtain additional data from sources other than the sensor devices 330, e.g., to provide context for obtained sensor data and/or sentiment data derived from the sensor data. For example, the SAC 310 can obtain information from local news sources, the Internet, and/or other sources to identify events occurring in the area 340 and/or to obtain other information to aid in classifying sentiment data. Techniques for maintaining classifications for sentiment data in this manner are described in further detail below with respect to FIG. 7.

Figure 4:
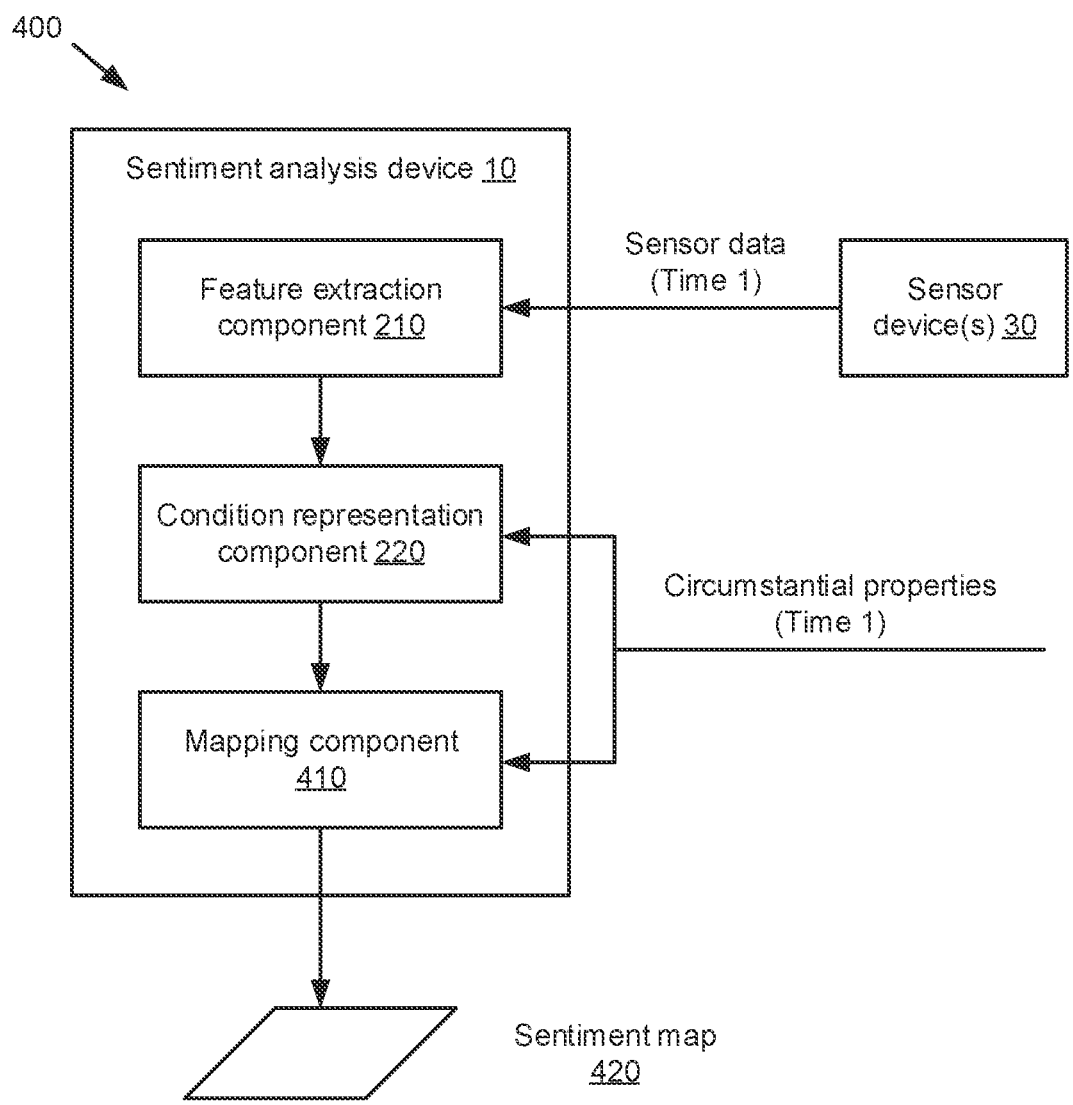
FIGS. 4-6 are respective block diagrams of a system that facilitates classifying and mapping sentiment data in accordance with various aspects described herein.
Figure 5:
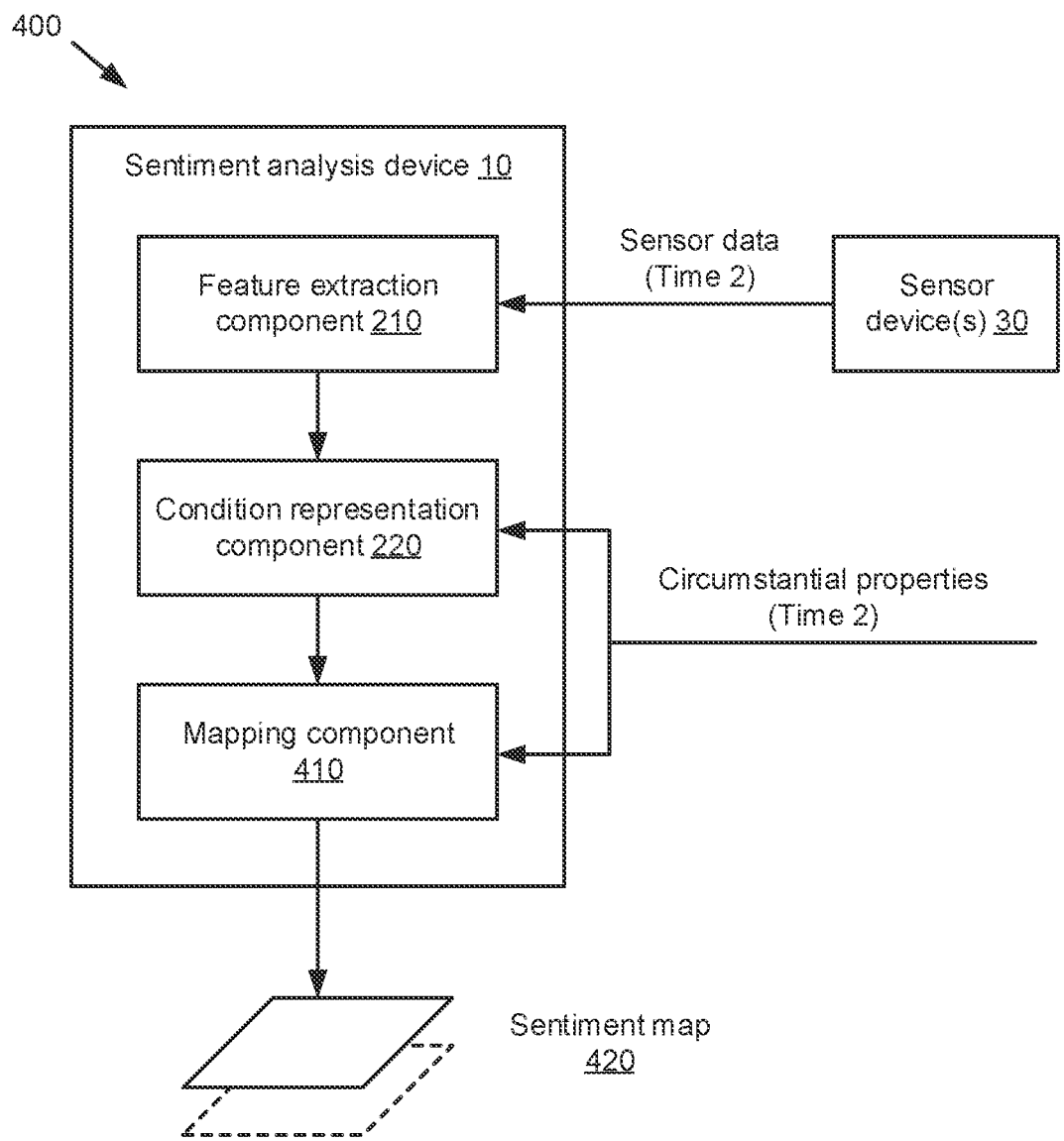
Figure 6:
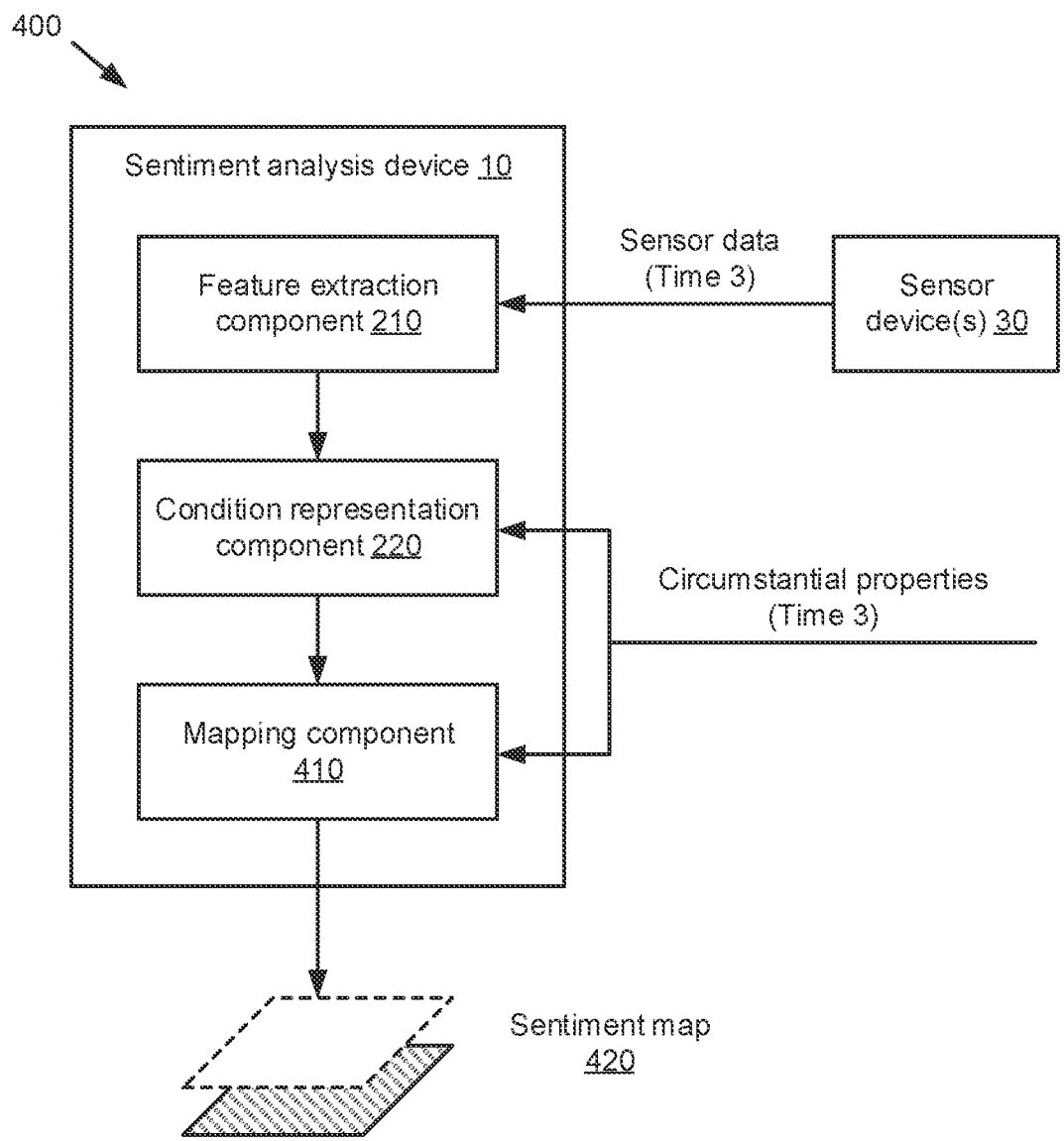

Turning to FIGS. 4-6, respective block diagrams of a system 400 that facilitates classifying and mapping sentiment data are illustrated. Repetitive description of like elements employed in other embodiments described herein is omitted for brevity. For purposes of illustration, FIGS. 4-6 illustrate example operations that can be performed by a sentiment analysis device 10 at respective points in time, labeled as times 1-3 in FIGS. 4-6, respectively. It is noted, however, that the operations shown in FIGS. 4-6 could occur in a different order than that depicted by FIGS. 4-6 and described below.

With reference first to FIG. 4, system 400 includes a sentiment analysis device 10, which can obtain sensor data from one or more sensor devices 30, e.g., at a first time, via a feature extraction component 210 as described above. The condition representation component 220 of the sentiment analysis device 10 can then correlate the sensor data to circumstantial properties, e.g., properties of an area associated with the sensor devices 30 at the first time, to generate sentiment data corresponding to the area as further described above.

Based on the circumstantial properties associated with the area in which the sensor devices 30 are located at the first time and the sentiment data generated by the condition representation component 220 as described above, a mapping component 410 of the sentiment analysis device 10 can generate a data structure representative of the area, e.g., a sentiment map 420 as shown in FIG. 4, and populate the data structure with the generated sentiment data.

In an implementation, the sentiment map 420 can be a physical map of the area in which the sensor devices 30 are located, and the mapping component 410 can populate the sentiment map 420 by plotting localized sentiment data within respective regions of the area represented by the sentiment map 420. For instance, sentiment data generated by the condition representation component 220 based on data provided by a specific sensor device 30 can be plotted on the sentiment map 420 at a location associated with that sensor device 30. In this way, the sentiment map 420 can represent both general trends for a given area as well as variations in sentiment among respective locations within the area. Other implementations of a data structure that can be generated by the mapping component 410 are also possible. For instance, the mapping component 410 can populate a database and/or a similar structure with sentiment data, which may or may not be representative of specific locations within the area. Similar regional granularity to the sentiment map 420 could be achieved via a database, e.g., by using a field or key in the database that specifies sensor location information and/or other regional indicators.

In an aspect, the sentiment map 420 generated by the mapping component 410 can be a multi-layer map, e.g., where each layer of the map represents a distinct circumstantial property or set of circumstantial properties. In the example shown by FIG. 4, the sentiment map 420 is not populated with any data prior to the first time (time 1). Accordingly, the mapping component 410 can generate and/or populate a first layer of the sentiment map 420 with the sentiment data provided by the condition representation component 220 at the first time. In an implementation, the mapping component 410 can include an index and/or other indicator of the circumstantial properties associated with the first layer of the sentiment map 420 in response to populating the first layer.

Subsequently, as shown by FIG. 5, the feature extraction component can extract data features from the sensor devices 30, e.g., the same sensor devices depicted in FIG. 4, at a second time (time 2). Based on circumstantial properties of the area in which the sensor devices 30 are located at the second time, the condition representation component 220 can generate sentiment data corresponding to the second time, e.g., as described above. Here, the circumstantial properties associated with the second time differ from the circumstantial properties associated with the first time as shown in FIG. 4. As a result, the mapping component 410 can generate and/or populate a new (second) layer of the sentiment map 420 with the sentiment data provided by the condition representation component 220 at the second time.

At a third time (time 3) as shown by FIG. 6, the condition representation component 220 can generate sentiment data for the area at the third time based on data features extracted by the feature extraction component 210 based on raw data received by the sensor devices 30 at the third time, e.g., as generally described above. Here, the circumstantial properties associated with the third time are the same as, or equivalent to, the circumstantial properties associated with the second time as shown in FIG. 5. As a result, the mapping component 410 can refine the second layer of the sentiment map 420, the layer of the sentiment map 420 populated at the second time as shown in FIG. 5, with the sentiment data provided by the condition representation component 220 at the third time.

By generating and utilizing a multi-layer sentiment map 420 as shown in FIGS. 4-6, the sentiment analysis device 10 can learn over time typical behaviors for a given area under respective sets of circumstances. By way of example, the sentiment analysis device 10 can determine that a large city center is generally busy on weekdays due to large numbers of people walking through the city center quickly, but that the same city center is frequented by tourists on nights and weekends that walk more slowly, e.g., for sightseeing. As another example, the sentiment analysis device 10 can determine that an area near a college campus generally experiences higher than normal amounts of foot traffic during football games or other events. The sentiment analysis device 10 can also compare traffic patterns between different events in the same area, e.g., to identify trends or changes in public behaviors over time under similar circumstances.

In an aspect, each layer of the sentiment map 420 generated by the mapping component 410 can represent a baseline sentiment for an area under a given set of circumstances. By way of example, respective layers of the sentiment map 420 can correspond to different times (e.g., morning, evening, etc.), dates or special occasions (e.g., holidays, elections, etc.), weather conditions (e.g., sunny, rainy, snowy, etc.), and/or any other suitable circumstances. By doing so, the sentiment analysis device 10 can be configured to understand external circumstances such as weather, train delays that force people to walk quickly after they get off the train, rushing to attend a sports game or parade on time, and/or other such circumstances. In some implementations, some or all of the data associated with the sentiment map 420 could be shared with government agencies or other entities to facilitate planning for natural disasters or other similar events.

Figure 7:
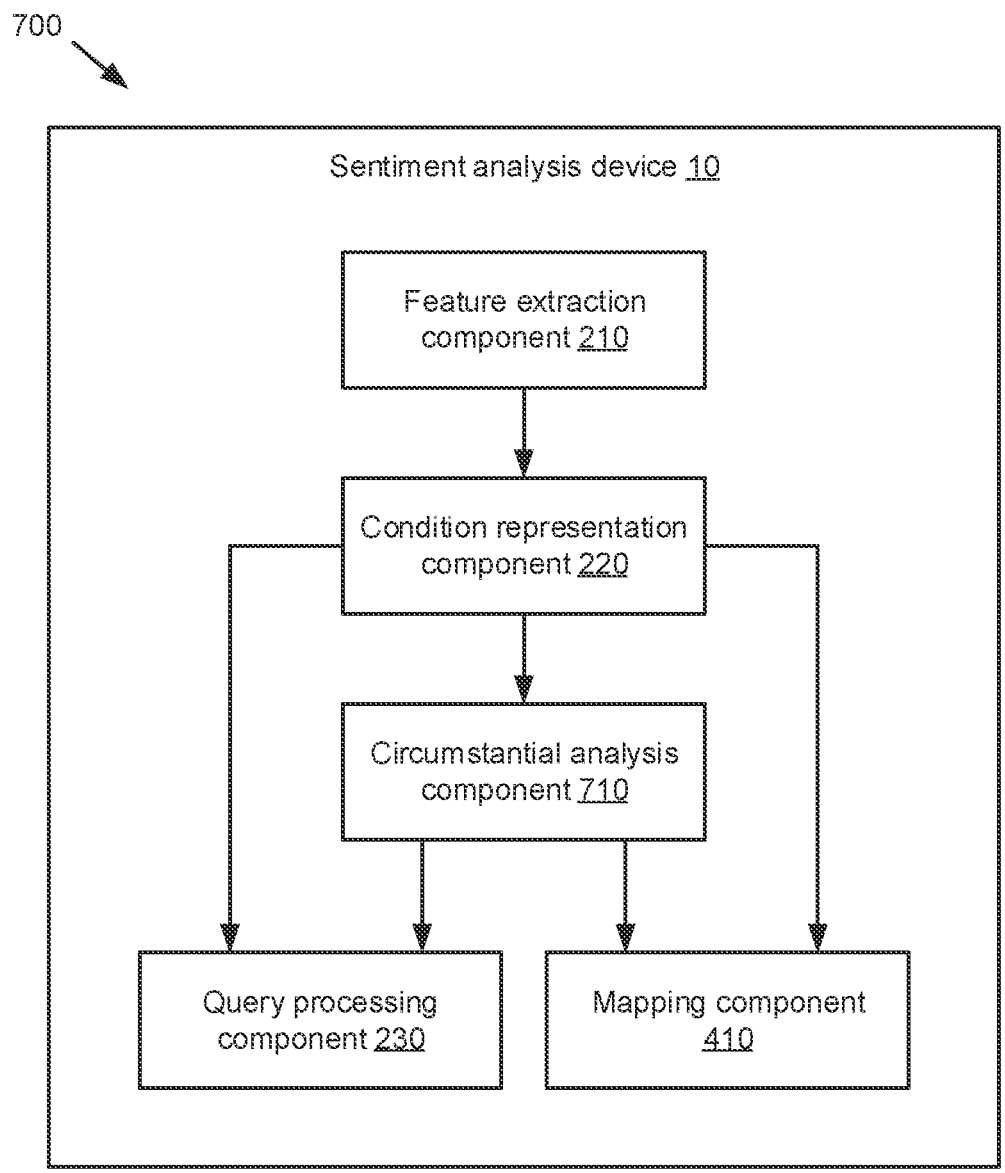
FIG. 7 is a block diagram of a system that facilitates determining transient properties associated with sentiment data in accordance with various aspects described herein.

With reference next to FIG. 7, a block diagram of a system 700 that facilitates determining transient properties associated with sentiment data is illustrated. Repetitive description of like elements employed in other embodiments described herein is omitted for brevity. System 700 as shown in FIG. 7 includes a sentiment analysis device 10, which includes a feature extraction component 210 and a condition representation component 220 that can facilitate providing sentiment data to a query processing component 230 and/or a mapping component 410, e.g., as described above. In addition, the sentiment analysis device 10 of system 700 includes a circumstantial analysis component 710, which can identify and/or otherwise determine circumstantial properties associated with sentiment data generated by the condition representation component 220.

In an implementation, the circumstantial analysis component 710 can determine circumstantial properties associated with a given set of sentiment data in response to determining that the sentiment data represents an outlier, e.g., with reference to a baseline sentiment represented by a sentiment map 420 as described above with respect to FIGS. 4-6. For instance, if sentiment data for a given area and set of circumstances differs from an expected or baseline value by more than a threshold amount, the circumstantial analysis component 710 can determine whether additional or changed circumstances are present in the sentiment data.

The circumstantial analysis component 710 can take geographical and/or cultural classifications of an area into account in determining whether a given set of sentiment data represents a deviation from a baseline sentiment. By way of example, the circumstantial analysis component 710 can determine that rapid pedestrian movement is common in a large city such as New York City, but that similar rapid pedestrian movement would be an outlier in a smaller town. Similarly, the circumstantial analysis component 710 can correlate attendance at churches or other houses of worship in a given area to demographic trends for that area to determine deviations from expected attendance levels. Other examples are also possible.

In an implementation, the circumstantial analysis component 710 can acquire context data from various external sources, such as local news outlets or the like, to aid in determining circumstantial properties associated with a given set of sentiment data. This can be done to determine new or changed circumstantial properties in the event of a deviation from an expected sentiment. For instance, in the event that the circumstantial analysis component 710 determines that a given area is experiencing an abnormal amount of pedestrian activity, the circumstantial analysis component 710 can consult news and/or other sources to identify an explanation for the abnormal activity, e.g., a large store grand opening, a fire or other emergency, etc.

As another example, the circumstantial analysis component 710 can track information provided by external sources to correlate behavior in an area to larger trends over time. For example, the circumstantial analysis component 710 can track employment statistics for a given area in order to correlate the employment statistics to levels of pedestrian or other traffic present in the area. This correlation can further be performed over a period of time, e.g., to correlate changes in employment levels in an area to similar changes in traffic patterns.

As a further example, the circumstantial analysis component can make inferences regarding expected sentiment associated with a given event based on baselines for similar events. By way of example, based on traffic patterns associated with a sports game held at an arena, the circumstantial analysis component 710 can infer traffic patterns associated with similar events held at the same arena, such as concerts or the like.

As a result of sentiment data generated by the sentiment analysis device 10 for a given area and/or correlations between the generated sentiment data and corresponding circumstances, the sentiment analysis device 10 can generate actionable insights. As an example, by analyzing pedestrian activity in an area over a learning period, the sentiment analysis device 10 could determine that stores and/or other businesses in the area are at risk of closure, e.g., due to fewer people walking by the stores, people walking angrily, etc. Similarly, the sentiment analysis device 10 can utilize generated sentiment data to direct advertisements and/or marketing strategies, optimize job markets and/or salaries, balance supply and demand, and/or perform other actions. In an implementation in which the sentiment analysis device 10 is deployed in a smart city, the sentiment analysis device 10 can also facilitate secure transmission and aggregation of data across the city, and/or other smart cities, to facilitate improved understanding of consumer sentiment and enable entities to better serve customers across an underlying geographic area.

Figure 8:
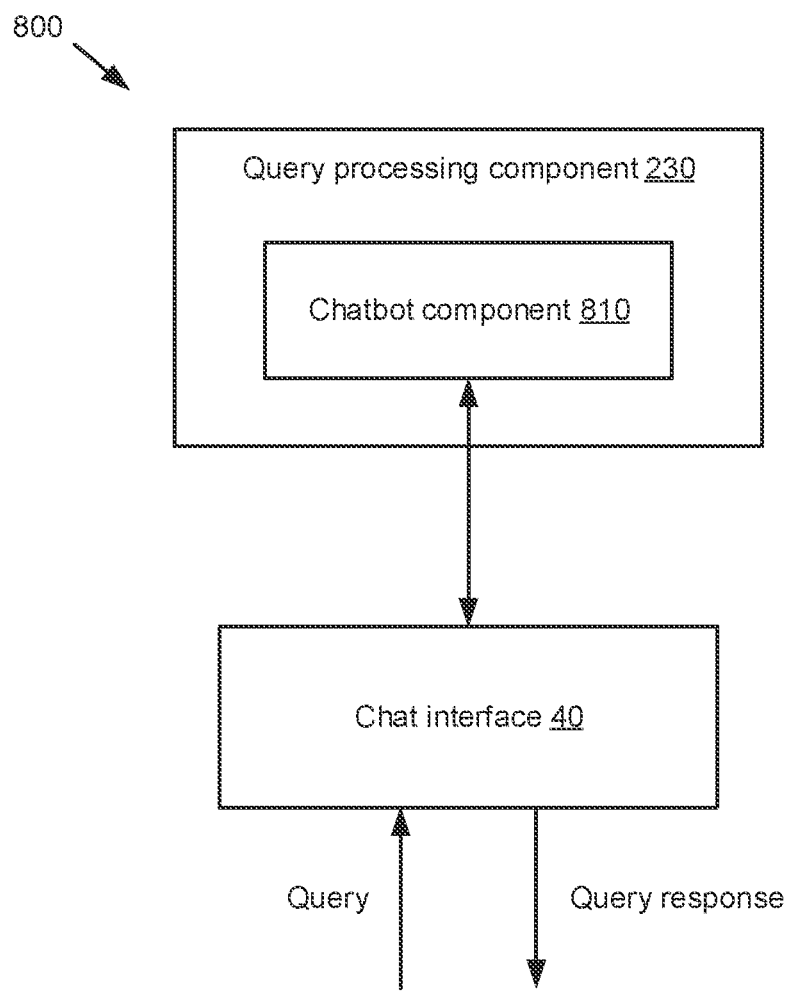
FIG. 8 is a block diagram of a system that facilitates responding to queries via a chat interface in accordance with various aspects described herein.

Turning next to FIG. 8, a block diagram of a system 800 that facilitates responding to queries via a chat interface 40 is illustrated. Repetitive description of like elements employed in other embodiments described herein is omitted for brevity. System 800 as shown in FIG. 8 includes a query processing component 230, which can include and/or otherwise enable a chatbot component 810. While the chatbot component 810 is illustrated in FIG. 8 as part of the query processing component 230, it is noted that the chatbot component 810 can be separate from the query processing component 230.

In an aspect, the query processing component 230 can train and/or otherwise prepare the chatbot component 810 to answer queries received via a chat interface 40. For instance, in response to receiving a query via the chat interface 40, the chatbot component 810 can prepare a response to the query, e.g., via one or more natural language processing techniques as known in the art, and render the response to the query in the chat interface 40. In various implementations, the chat interface 40 can be a text interface, an audio interface, a video interface, and/or any other suitable interface type. By way of example, the chatbot component 810 can be implemented as a live hologram that provides visual and/or auditory responses to queries provided via the chat interface 40. Other implementations are also possible.

In another aspect, the chatbot component 810 can be configured to provide responses to queries received via the chat interface 40 based on sentiment data, e.g., sentiment data generated for an area as described above. In this way, the chatbot component 810 can provide actionable insights to users via the chat interface 40 in response to user queries. By way of a non-limiting example, in response to a query regarding whether a store will need additional stock prior to a holiday, the chatbot component 810 can leverage data relating to consumer sentiment in an area near the store to determine an estimated level of demand, which can then be relayed to the chat interface 40 as a response to the query.

In some implementations, the chatbot component 810 can utilize sentiment data corresponding to a particular user in crafting responses to queries submitted by that user via the chat interface 40. For instance, a user experience associated with a holographic communication system or other audiovisual application, or portions of the user experience (e.g., advertisements or product placement, etc.), can be tailored to individual users based on the preferences of those users, e.g., as determined according to sentiment data for those users.

Figure 9:
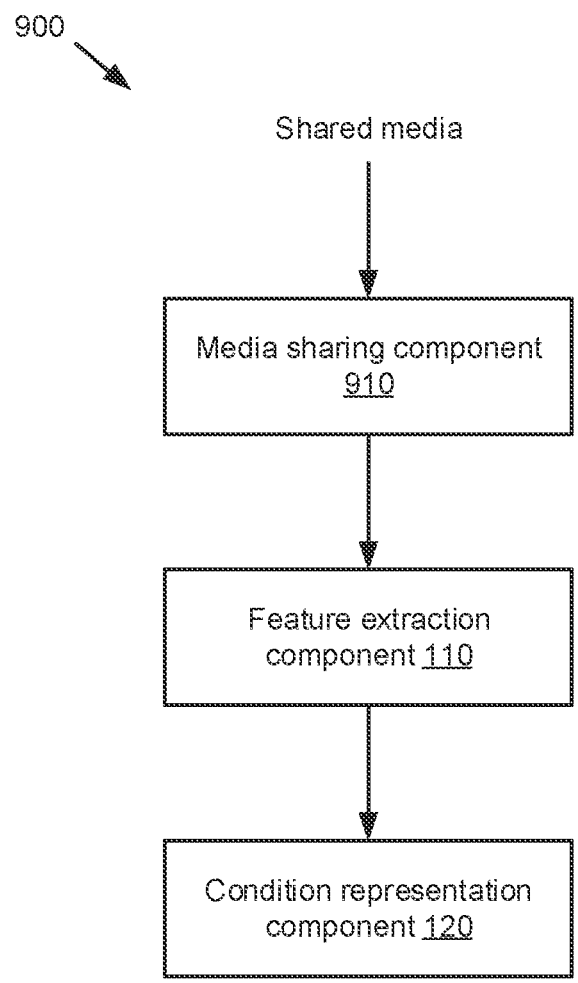
FIG. 9 is a block diagram of a system that facilitates determining sentiment data via shared media in accordance with various aspects described herein.

Referring now to FIG. 9, a block diagram of a system 900 that facilitates determining sentiment data via shared media is illustrated. Repetitive description of like elements employed in other embodiments described herein is omitted for brevity. As shown in FIG. 9, system 900 includes a media sharing component 910 that can collect images and/or other media, e.g., via a media sharing service, and provide the media to the feature extraction component 110 for processing in a similar manner to sensor data as described above.

In an aspect, the media sharing component 910 can be implemented as an application, website, or other service in which participants (e.g., vehicles, IoT devices, individuals, etc.) can register, e.g., via an opt-in agreement and/or other means for obtaining affirmative consent for media sharing. Subsequently, registered users can upload or otherwise share photos, videos, or other media to the media sharing component 910. In return for sharing photos or other media, the media sharing component 910 can provide compensation to registered users, such as gift cards, discounts, cryptocurrency, access to events, or other suitable forms of compensation.

Figure 10:
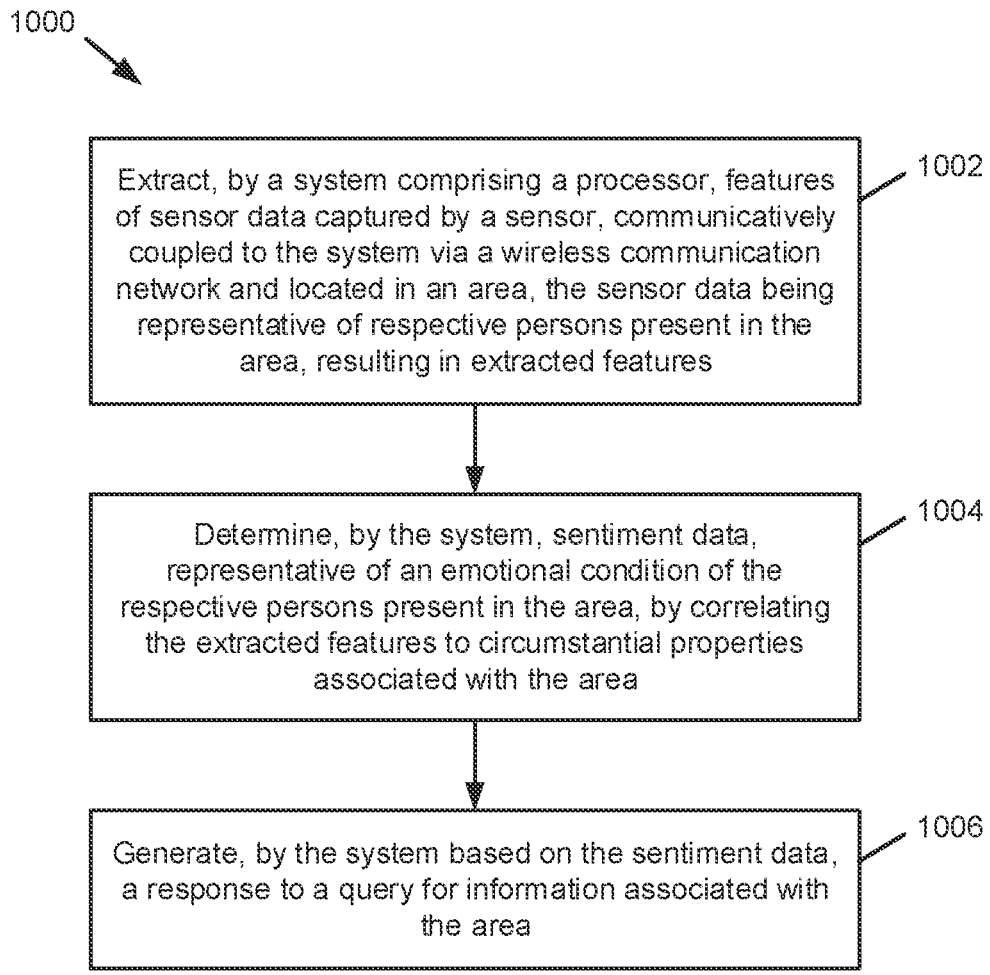
FIG. 10 is a flow diagram of a method that facilitates sentiment capture by wireless network elements in accordance with various aspects described herein.

FIG. 10 illustrates a method in accordance with certain aspects of this disclosure. While, for purposes of simplicity of explanation, the method is shown and described as a series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

With reference to FIG. 10, a flow diagram of a method 1000 that facilitates sentiment capture by wireless network elements is presented. At 1002, a system comprising a processor (e.g., a sentiment analysis device 10 comprising a processor 14, and/or a system including such a device) can extract (e.g., by a feature extraction component 210 and/or other components implemented by the processor 14) features of sensor data captured by a sensor (e.g., a sensor of a sensor device 30) that is communicatively coupled to the system via a communication network (e.g., a communication network 20) and located in an area. The sensor data for which features are extracted at 1002 can be representative of respective persons and/or other subjects present in the area associated with the sensor.

At 1004, the system can determine (e.g., by a condition representation component 220 and/or other components implemented by the processor 14) sentiment data representative of an emotional condition of the respective persons present in the area for which extracted features were generated at 1002 by correlating the features extracted at 1002 to circumstantial properties associated with the area.

At 1006, the system can generate (e.g., by a query processing component 230 and/or other components implemented by the processor 14) a response to a query for information associated with the area based on the sentiment data determined at 1004.

Figure 11:
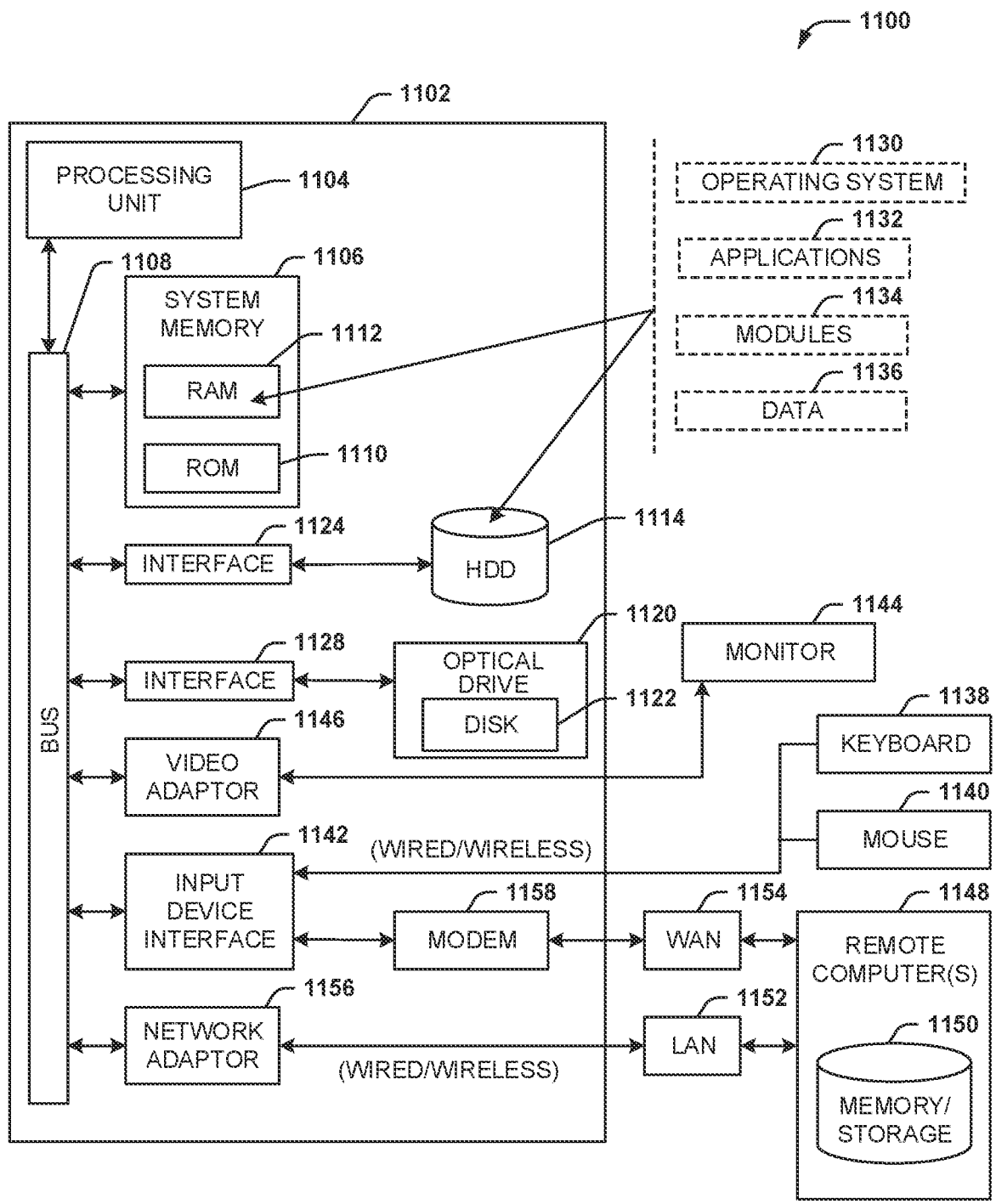
FIG. 11 depicts an example computing environment in which various embodiments described herein can function.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 and an optical disk drive 1120, (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114 and optical disk drive 1120 can be connected to the system bus 1108 by an HDD interface 1124 and an optical drive interface 1128, respectively. The HDD interface 1124 can additionally support external drive implementations via Universal Serial Bus (USB), Institute of Electrical and Electronics Engineers (IEEE) 1394, and/or other interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) can include a microphone, an infrared (IR) remote control, a joystick, a game pad, a stylus pen, touch screen or the like. These and other input devices are often connected to the processing unit 1104 through an input device interface 1142 that can be coupled to the system bus 1108, but can be connected by other interfaces, such as a parallel port, an IEEE 1394 serial port, a game port, a USB port, an IR interface, a BLUETOOTH® interface, etc.

A monitor 1144 or other type of display device can be also connected to the system bus 1108 via an interface, such as a video adapter 1146. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1152 through a wired and/or wireless communication network interface or adapter 1156. The adapter 1156 can facilitate wired or wireless communication to the LAN 1152, which can also include a wireless access point (AP) disposed thereon for communicating with the wireless adapter 1156.

When used in a WAN networking environment, the computer 1102 can include a modem 1158 or can be connected to a communications server on the WAN 1154 or has other means for establishing communications over the WAN 1154, such as by way of the Internet. The modem 1158, which can be internal or external and a wired or wireless device, can be connected to the system bus 1108 via the input device interface 1142. In a networked environment, program modules depicted relative to the computer 1102 or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    extracting, by a system comprising a processor, features of sensor data captured by a at least one sensor, communicatively coupled to the system via a wireless communication network and located in an area, wherein the sensor data is representative of respective persons present in the area, resulting in extracted features, wherein the extracted features include extracted properties of speech uttered by at least one person of the respective persons and extracted properties of video data,
        wherein the extracted properties of the speech include: voice tones present in the speech, content of the speech, volume of the speech, and keywords that provide cues as to sentiment, and
        wherein the extracted properties of the video data include: facial expressions of a depicted person included in the respective persons, a movement of the depicted person, and a posture of the depicted person;

determining, by the system, sentiment data, representative of an emotional condition of the respective persons present in the area, by correlating the extracted features to circumstantial properties associated with the area;

generating, by the system based on the sentiment data, a response to a query for information associated with the area, wherein the features of the sensor data are first features of first sensor data captured at a first time, wherein the extracted features are first extracted features, wherein the sentiment data is first sentiment data, and wherein the circumstantial properties comprise a first circumstantial property associated with the area at the first time;

extracting, by the system, second features of second sensor data captured by the at least one sensor at a second time, wherein the second sensor data is representative of the respective persons present in the area, resulting in second extracted features; and determining, by the system, second sentiment data, representative of the emotional condition of the respective persons present in the area, by correlating the second extracted features to a second circumstantial property associated with the area at the second time.

2. The method of claim 1, further comprising:
populating, by the system, a first layer of a map representative of the area with the sentiment data.

3. The method of claim 2, further comprising:
populating, by the system in response to determining that the first circumstantial property is different from the second circumstantial property, a second layer of the map with the second sentiment data.

4. The method of claim 3, wherein the determining that the first circumstantial property is different from the second circumstantial property is in response to the first sentiment data being determined to differ from the second sentiment data by at least a threshold amount, and wherein the method further comprises:
identifying, in further response to the determining that the first circumstantial property is different from the second circumstantial property, the second circumstantial property.

5. The method of claim 2, further comprising:
refining, by the system in response to determining that the first circumstantial property is equivalent to the second circumstantial property, the first layer of the map based on the second sentiment data.

6. The method of claim 1, further comprising:
receiving, by the system from a chat interface, the query; and
rendering, by the system via a chatbot enabled by the system, the response to the query in the chat interface.

7. The method of claim 1, wherein the circumstantial properties include a property selected from a group of properties comprising time of day, time of year, weather conditions, and events occurring in the area.

8. The method of claim 1, wherein the system is a first system, and wherein the sensor is associated with a second system selected from a group of systems comprising a vehicle communication system and a holographic communication system.

9. The method of claim 1, wherein the features of the sensor data are selected from a group of features comprising facial features and voice features.

10. A system, comprising:
a processor; and
a memory that stores executable instructions that, when executed by the processor, facilitate performance of operations, comprising:
extracting data features captured by at least one sensor, communicatively coupled to the system via a wireless communication network and located in an area, resulting in extracted data features, wherein the data features are representative of respective persons in the area, wherein the extracted data features include extracted properties of speech uttered by at least one person of the respective persons and extracted properties of video data,
wherein the extracted properties of the speech include: voice tones present in the speech, content of the speech, volume of the speech, and keywords that provide cues as to sentiment, and
wherein the extracted properties of the video data include: facial expressions of a depicted person included in the respective persons, a movement of the depicted person, and a posture of the depicted person;
generating condition data, representative of an emotional condition of the respective persons in the area, by correlating the extracted data features to circumstantial properties of the area;
generating, based on the condition data, a response to a query relating to the area, wherein the data features are first data features captured by the at least one sensor at a first time, wherein the extracted data features are first extracted data features, wherein the condition data is first condition data, and wherein the circumstantial properties comprise a first circumstantial property associated with the area at the first time;
extracting second data features captured by the at least one sensor at a second time, resulting in second extracted data features, wherein the second data features are representative of the respective persons in the area; and
generating second condition data, representative of the emotional condition of the respective persons in the area, by correlating the second extracted data features to a second circumstantial property associated with the area at the second time.

11. The system of claim 10, wherein the operations further comprise:
populating a first layer of a data structure representative of the area with the condition data.

12. The system of claim 11, wherein the operations further comprise:
populating, in response to determining that the first circumstantial property is different from the second circumstantial property, a second layer of the data structure with the second condition data.

13. The system of claim 11, wherein the operations further comprise:
refining, in response to determining that the first circumstantial property is a same property as the second circumstantial property, the first layer of the data structure based on the second condition data.

14. A non-transitory machine-readable medium, comprising executable instructions that, when executed by a processor, facilitate performance of operations, comprising:
determining data features that are representative of sensor data, captured by a at least one sensor located in an area and provided by the at least one sensor via a wireless communication network, wherein the sensor data is representative of persons present in the area, wherein the data features include extracted properties of speech uttered by at least one person of the persons and extracted properties of video data,
  wherein the extracted properties of the speech include: voice tones present in the speech, content of the speech, volume of the speech, and keywords that provide cues as to sentiment, and
  wherein the extracted properties of the video data include: a facial expression of a depicted person included in the persons, a movement of the depicted person, and a posture of the depicted person;
generating sentiment data, representative of an emotional condition of the persons present in the area, by correlating the data features with transient properties associated with the area;
preparing, based on the sentiment data, response data representative of a response to a query for information relating to the area, wherein the sensor data is first sensor data captured by the at least one sensor at a first time, wherein the data features are first data features, wherein the sentiment data is first sentiment data, and wherein the transient properties comprise a first transient property associated with the area at the first time;
determining second data features that are representative of second sensor data, captured by the at least one sensor at a second time, wherein the second sensor data is representative of the persons present in the area; and
generating second sentiment data, representative of the emotional condition of the persons present in the area, by correlating the second data features to a second circumstantial property associated with the area at the second time.

15. The non-transitory machine-readable medium of claim 14, wherein the operations further comprise:
  populating a first layer of a map representative of the area with the sentiment data.

16. The non-transitory machine-readable medium of claim 15, wherein the operations further comprise:
  populating a second layer of the map with the second sentiment data in response to determining that the first transient property is different from a second transient property of the transient properties.

17. The non-transitory machine-readable medium of claim 15, wherein the operations further comprise:
  refining the first layer of the map based on the second sentiment data in response to determining that the first transient property is equivalent to a second transient property of the transient properties.

18. The non-transitory machine-readable medium of claim 14, wherein the at least one sensor includes a plurality of sensors, the plurality of sensors including a microphone and a camera.

19. The non-transitory machine-readable medium of claim 14, wherein the extracted properties of the video data include changes in the facial expression, and wherein the posture of the depicted person includes an identification of whether the depicted person is walking or running and a characteristic of a body language of the depicted person.

20. The non-transitory machine-readable medium of claim 15, wherein the map includes a representation of general trends in sentiment for the area and variations in sentiment among respective locations within the area.

* * * * *